Feb. 21, 1967 F. P. MANETTI ETAL 3,305,702

MOUNTING BASE FOR TELEVISION PICTURE TUBE COMPONENTS

Filed Feb. 11, 1965

2 Sheets-Sheet 1

Inventors
Fred P. Manetti
and Lewis Klier
By Petherbridge, O'Neill & Aubel
Attys.

Feb. 21, 1967 F. P. MANETTI ETAL 3,305,702
MOUNTING BASE FOR TELEVISION PICTURE TUBE COMPONENTS
Filed Feb. 11, 1965
2 Sheets-Sheet 2

Inventors
Fred P. Manetti
and Lewis Klier
By Petherbridge, O'Neill & Aubel
Attys United States Patent Office 3,305,702
Patented Feb. 21, 1967

3,305,702
MOUNTING BASE FOR TELEVISION PICTURE TUBE COMPONENTS

Fred P. Manetti, River Forest, and Lewis Klier, Arlington Heights, Ill., assignors to American Plasticraft Company, Chicago, Ill., a corporation of Illinois Filed Feb. 11, 1965, Ser. No. 431,929
3 Claims. (Cl. 317—99)

The present invention relates to mounting bases for electronic components used in television picture tubes, and more particularly to an improved mounting base for a high-voltage rectifier tube and a flyback transformer.

In prior art television sets the high-voltage rectifier tube and the flyback transformer are mounted as separate units in the so-called high voltage cage on the chassis of the television set. The separate mounting of the high-voltage rectifier tube and the flyback transformer is space consuming and relatively expensive.

In mounting the high-voltage rectifier tube and the flyback transformer it is desirable to assure that the high voltage lead connecting the transformer to the rectifier tube is spaced from the high voltage lead connecting the transformer to components external to the high cage. Also, the filament leads of the high-voltage rectifier tube should be spaced from the transformer as well as from adjacent wiring and ground points. In general, all high voltage leads should be kept away from hot tubes and resistors to prevent deterioration of the leads, such deterioration may lead to arcing and premature failure of the rectifier. Also the length of the high voltage leads should be kept at a minimum to prevent or reduce corona.

Accordingly, it is a principal object of the present invention to provide an improved mounting base for mounting an electron tube and a transformer on a single compact structure, which mounting base permits suitable isolation to be maintained between the tube, the transformer and the associated leads.

It is another object of the present invention to provide an improved mounting base for a high-voltage rectifier tube and a flyback transformer for use in a television set.

It is another object of the present invention to provide a mounting base for a high-voltage rectifier tube and a flyback transformer for a television set, which mounting base is compact and in which the lengths of the associated connecting leads are minimum.

In the attainment of the foregoing objects we provide a mounting base including a base plate arranged to be mounted on the chassis of the television set. A socket cup formed on the base plate is arranged to receive a high-voltage rectifier tube. A mounting pad formed on the base plate is arranged for mounting a flyback transformer thereon. The mounting base is arranged to compactly mount the high-voltage rectifier tube and the flyback transformer; and, to provide shielding and isolation between the high-voltage rectifier tube and the flyback transformer and the associated leads.

The foregoing and other objects and advantages of the present invention will become apparent after a consideration of the specification and claims as read in conjunction with the accompanying drawings, in which like reference characters refer to like elements throughout and in which:

Figure 1:
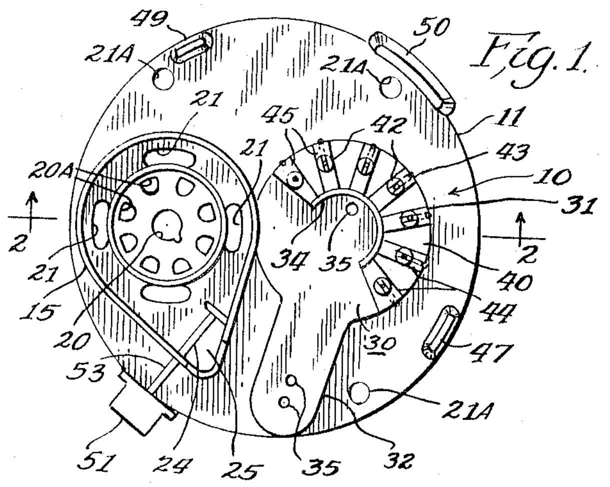
FIG. 1 is a top plan view of the mounting base in accordance with the invention.
Figures 2, 3, 4:
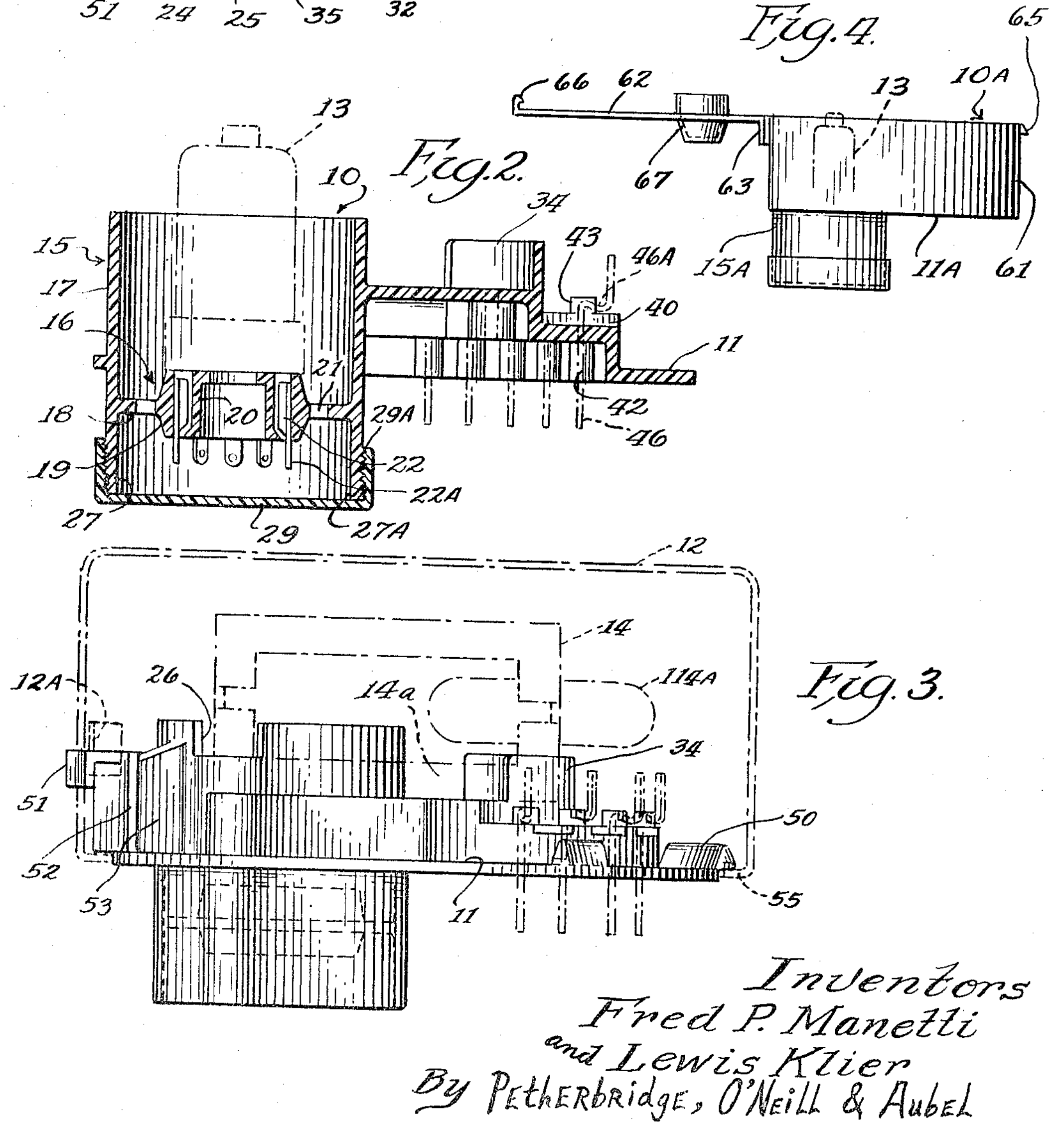
FIG. 2 is a cross sectional view taken along lines 2—2 of FIG. 1 and showing a rectifier tube in general outline.
FIG. 3 is a side elevational view of the mounting base of FIG. 1 and showing a metal can and a flyback transformer in general outline.
FIG. 4 is a side elevational view of a second embodiment of the mounting base in accordance with the invention.

Referring to FIGS. 1, 2 and 3 of the drawings, the high-voltage socket and flyback transformer mounting base 10 includes a base plate 11 which is arranged to be mounted on the chassis of the television set as by screws (not shown) inserted in the holes 21 formed on the periphery of the base plate 11. In this embodiment the base plate is circular but it can be of any suitable shape adapted to be mounted on the television set chassis.

The mounting base 10 may be of any suitable, dielectric material, and it has been found that polyethylene compounds have the requisite characteristics of sufficient strength to resist stress cracking, sufficient resiliency to permit the required yieldability; high heat resistance and flame retarded properties; and, good dielectric properties to provide an excellent mounting base.

As will be discussed in more detail hereinbelow, a high-voltage rectifier tube 13, indicated by broken lines in FIG. 2, and a generally rectangular shaped dipole flyback transformer 14, indicated by broken lines in FIG. 3, are mounted on the base plate 11. A metallic can 12 (see FIG. 3), indicated by the broken lines, covers the base plate 11 when the plate 11 is in its fixed or operating position in the television set chassis affixed as by suitable fastening means (not shown) inserted through spaced holes 21A on the periphery of base plate 11. As is known, the can 12 will provide a shielding cage for the units mounted on the base plate 11.

The base plate 11 includes a socket cup 15 having a cylindrical tube-receiving socket 16 formed by an annular wall 17 and a bottom wall 18. The socket cup 15 may be of any suitable tubular design and in the embodiment of FIGS. 1, 2 and 3 it is formed in a pear shape. The bottom wall 18 is formed with an axial boss 19 having a keyed opening 20 to receive the center pin or stud on the rectifier tube. A plurality of circumferentially spaced holes 20A are formed on the bottom wall 18, for receiving respective contact terminals 22. Holes 21 provide ventilation passageways as is known in the art. The terminals 22 may be of conventional construction and they are provided to make electrical contact with the tube pins inserted into the holes 21 when the rectifier tube 13 is in position. Each terminal 22 has a connector portion 22A that projects beneath the bottom face of wall 18 to provide a terminal to which the lead wire of the associated electronic circuitry may be connected. A divider wall 24 is formed across the apex of cup 15 to define a tubular opening 25; and, the lead wires (not shown) for the rectifier tube 13 are routed upwardly through the said tubular opening 25. The leads are thus physically and electrically shielded from the rectifier tube by the divider wall 24. The top portion 26 of the apex of cup 15 (see FIG. 3) is slotted to provide a passageway for extending the leads out of the socket cup 15, the wall 24 extends upwardly from wall 18 to approximately the level of the slotted portion 26, see FIG. 3.

An annular skirt 27 which constitutes an extension of the annular wall 17 of cup 15 extends below the bottom wall 18. The skirt 27 is of sufficient length to locate its bottom edge below the lower ends of terminals 22A. The outside circumferential base of the skirt is formed with closely spaced screw threads 27A (shown in exaggerated scale in FIG. 1) which extend about one-half inch upwardly from the bottom edge of the skirt. The bottom of the skirt is closed by a mating cap 29, to provide a moisture proof closure and to enclose the terminals 22A and the associated lead wires within the skirt. The cap 29 is comprised of an end wall and a peripheral flange which has internal threads 29A. The cap 29 may be fitted easily and quickly over the skirt and when in place it is held firmly by interengagement of the matching threads 27A and 29A, and cap 29 may be removed by prying or working the cap off of the skirt 27.

The mounting pad 30 for the flyback transformer 14 includes a circular portion 31 which is positioned immediately adjacent the socket cup 15, and a stem 32 extending radially outwardly from the periphery of circular portion 31. The circular section 31 accommodates the doughnut shaped coil 114A indicated by a dot dashed line in FIG. 3, on the flyback transformer 14. The stem 32 provides a pad on which one of the sides **14*a* of the flyback transformer 14 may be securely positioned. Bolt or screw holes 35 are formed in the mounting pad 30 to receive bolts or screws (not shown) for securing the flyback transformer 14 thereto. An upstanding arcuate wall 34 formed toward the center of the circular section 31 provides a shoulder against which the flyback transformer 14** may be positioned.

An arcuate segment 40 of the circular section 31 is tiered or stepped down. A plurality of pin receiving holes 42 are formed in the spaced relation along the periphery of the arcuate segment 40 for receiving respective connector pins 46, indicated by broken lines in FIG. 2. The holes 42 have upstanding circular tabs 43 associated therewith. The tabs 43 are formed on radially extending risers 44 extending outwardly such as spokes in segment 40, and a slit 45 is formed along their center (see also FIG. 1). The pins 46 have a step or bend 46A which fits into the slit 45 formed in the tabs 43. The bent portion 46A of each of the pins 46 engage the sides of the slits 45 to secure the pins in position. As is known the leads from the windings on the flyback transformer are connected by any suitable means to the top portion of the pins 46 and the leads to the associated electronic circuitry are likewise connected to the lower portion of the pins 46.

Spaced on the periphery of the base plate 11 are two upstanding guide tabs 47 and 49 for guiding the can 12 to a position around the periphery of the base plate 11. A locking projection 50 is formed on one surface of the base plate 11 and extends slightly over the edge of the base plate 11 (see FIGS. 1 and 3). Approximately diametrically opposite to the locking projection 50, is a hinge 51 (see FIGS. 1 and 3) formed on an upstanding wall 52 affixed to a reinforcing rib 53 formed integrally with a side of cup 15 and with the base plate 11. A hole 12A is formed in the can 12 to receive the hinge 51 to provide a pivot or hinge for the can 12. The can 12 includes a lip 55 which can be fitted over and hooked on the locking projection 50 to fix the can in position.

Figure 5:
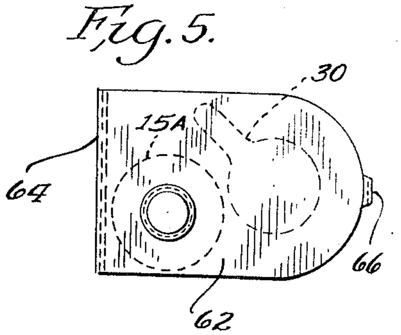
FIG. 5 is a top plan view of the embodiment of FIG. 4.

A second embodiment of the mounting base according to the invention is shown in FIGS. 4 and 5. In this second embodiment the mounting base 10A is an oblong shape as clearly shown in FIG. 5. The entire assembly is formed of a dielectric material including a cap or cover 62 which is used in lieu of the metal can 12. In FIGS. 4 and 5 the mounting base 10A includes upstanding side walls 61 formed on the base plate 11A. The relative position of the socket cup 15A and of the mounting pad 30 on the base plate 11A in the embodiment of FIGS. 4 and 5 remains essentially the same as that shown in FIGS. 1, 2 and 3 although in this embodiment the socket cup 15A is circular in shape. Affixed to the top of one side wall is the cap or cover 62 which covers the overall mounting base 10A.

The cap 62 is formed integrally with the base plate

11A and the side walls 61 to provide a hinge 63 along a line or section 64 on the top edge of wall 61. As can be appreciated the cap 62 is closed to pivot on hinge 63 and cover the mounting base 10A. A catch 65 is formed on the wall 61 in a position opposite to the hinge 63, and a latch is formed on cap 62 which engages the catch 65 to secure the cap in position. The cap 62 includes an anode hat or cover 67 which encloses the anode of the rectifier tube shown in brief outline in FIG. 4. Since in the embodiment of FIGS. 4 and 5 a dielectric cover (cap 62) is used instead of the metal can 12 cage used in the embodiment of FIGS. 1, 2 and 3, the overall size of the mounting base 10A may be made smaller than that of mounting base 10.

Figures 6, 7, 9:
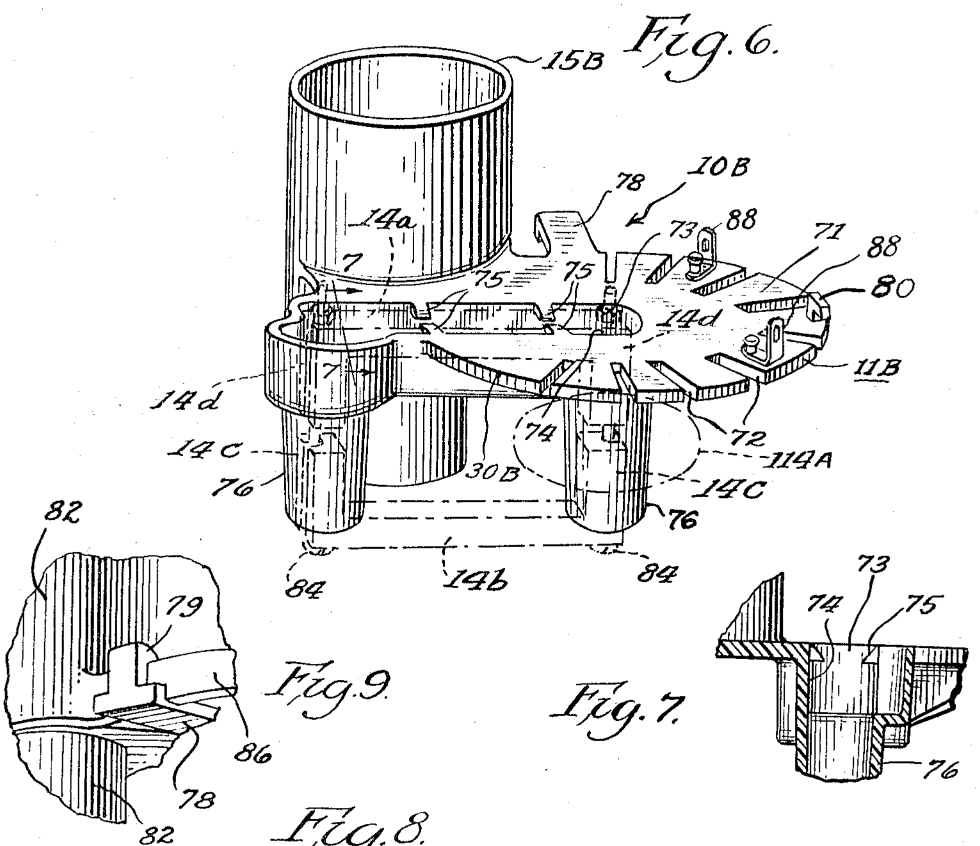
FIG. 6 is a perspective view of a third embodiment of the mounting base of my invention.
FIG. 7 is a cross sectional view taken along line 7—7 of FIG. 6.
FIG. 9 is a cut-away perspective view showing a latching means for securing the cover of FIG. 8 to the embodiment of FIG. 6.
Figure 8:
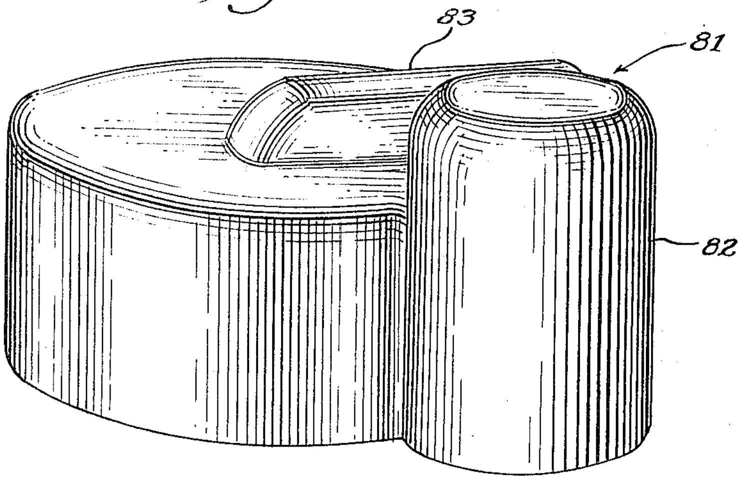
FIG. 8 is a perspective view of a cover for the embodiment of FIG. 6.

A third embodiment of the mounting base of the invention is shown in FIGS. 6, 7 and 8. In this third embodiment of the mounting base 10B the socket cup 15B for receiving the high-voltage rectifier tube and the mounting pad 30B are in the same relative position as in the previously described embodiments. A cover 81, shown in FIG. 8, encloses and covers the components mounted on base 10B.

In the showing of FIG. 6, the mounting base 10B is drawn in a reverse or up-side-down position to provide a clearer showing of the details of the base. Thus, the mounting base 10B as shown in FIG. 6 would be reversed and then the cover 81 placed thereon.

The mounting pad 30B includes a circular section 71 which has a series of spaced slits 72 extending radially inwardly from its periphery. The slits 72 provide channels or passageways for the various lead wires, not shown, connecting to the terminal pins 88 on the base plate 11B and to the associated electrical circuitry. Only three terminal pins are shown on base plate for purposes of clarity in drawing; however, normally there would be about ten terminal pins 88. A recess 73 is formed to extend radially outwardly from the center of section 71 to receive a side 14A of transformer 14. One or more triangular positioning tabs 75 are formed along the interior walls 74 of recess 73; see also FIG. 7; the tabs 75 position and snug side 14A in recess 73.

A pair of hollow posts 76 are formed on the mounting base 10B to provide a secure mounting for the transformer 14. To position the transformer 14 in the mounting base 10B, the legs **14*c* of one part 14*b* of the dipole transformer 14 are inserted into the posts 76 from the top of the mounting base 10B. (As noted above, FIG. 6 shows the mounting base in an up-side-down position.) The legs 14*d* of the other part 14*c* of the transformer 14 are then inserted in the posts 76 and the side 14A of the transformer is positioned in recess 73. The doughnut coil 114A encircles one of the posts 76. Suitable bolt and nut units extend upwardly through the posts and secure the two halves of the transformer 14** together.

An arm 78 extends outwardly from the periphery of section 71. Arm 78 includes a latching catch 79 thereon which is used to engage a shoulder 86 formed on the lower or open edge of cover 81 to secure the cover 81 to the mounting base 10B. An upright catch 80, see FIG. 6, engages a suitable projection, not shown, formed on the chassis for affixing the relative position of the mounting base 10B on the chassis.

The cover 81 for the mounting base 10B is arranged to fit around the periphery of section 71 and to conform closely to the shape of the elements positioned on the base 10B. The cover 81 includes a portion 82 which slips over the socket cup 15 of the high-voltage rectifier and secures the cover 81 in position. The cover 81 further includes a portion 83 which conforms to or fits over the upper leg of the transformer 14. Since the cover 81 is of dielectric material, the cover may be positioned closely to the rectifier tube 13 and to the transformer 14 to protect and shield these elements and yet not incur the potential danger of arc-over or grounding.

While the present invention has been described in connection with particular embodiments thereof, it will be understood by those skilled in the art that various modifications and changes may be made thereto without departing from the true spirit and scope of the invention. Therefore, it is intended that the claims in this case cover all such modifications and changes which fall within the true spirit and scope of our invention.

I claim:

1. A mounting base for a high-voltage rectifier tube and flyback transformer used in a television set comprising in combination,
 (a) a base plate arranged to be mounted on the associated television set chassis,
 (b) a pad for receiving said transformer formed integrally with said plate,
 (c) a socket cup for receiving said tube, said socket cup being formed integrally with said plate, and said socket cup having upstanding side walls which shield the bottom portion of said tube from said transformer,
 (d) a spacer wall formed internally in said socket cup for forming a passageway for the leads emanating from said tube to shield said leads from said tube.

2. A mounting base as in claim 1, wherein
 (a) a wall is formed within said cup in a direction along the axis of the cup to form a passageway for the electrical leads extending for the pins in said tube to the associated electronic circuitry, said wall and pasageway protecting and shielding said leads from said tube, which tube when in operation becomes heated.

3. A mounting base as in claim 1 wherein:
 (a) said pad has radially and inwardly extending slits formed on the periphery of said base plate for receiving and providing channels for associated electrical wiring,
 (b) said pad further having a recess formed therein for receiving a portion of the transformer, and
 (c) inwardly extending positioning tabs formed on the walls of said recess for securely positioning said received portion of said transformer in said recess.

References Cited by the Examiner

UNITED STATES PATENTS

| | | | |
|---|---|---|---|
| 2,752,413 | 5/1956 | Junkins | 339—147 |
| 2,837,709 | 6/1958 | Milinowski | 217—101 X |
| 3,035,210 | 5/1962 | Setchell | 317—101 |
| 3,201,653 | 8/1965 | Nuss | 317—99 |

ROBERT K. SCHAEFER, *Primary Examiner.*

M. GINSBURG, *Assistant Examiner.*